(12) United States Patent
Ista

(10) Patent No.: US 9,929,500 B1
(45) Date of Patent: Mar. 27, 2018

(54) PLUGGABLE TRANSCEIVER MODULE WITH INTEGRATED RELEASE MECHANISM

(71) Applicant: Tyler Ista, San Rafael, CA (US)

(72) Inventor: Tyler Ista, San Rafael, CA (US)

( * ) Notice: Subject to any disclaimer, the term of this patent is extended or adjusted under 35 U.S.C. 154(b) by 0 days.

(21) Appl. No.: 15/455,123

(22) Filed: Mar. 9, 2017

(51) Int. Cl.
*H01R 13/627* (2006.01)

(52) U.S. Cl.
CPC .................... *H01R 13/6271* (2013.01)

(58) Field of Classification Search
CPC ............ H01R 13/6271; H01R 13/6272; H01R 13/62905
See application file for complete search history.

(56) References Cited

U.S. PATENT DOCUMENTS

| | | | | |
|---|---|---|---|---|
| 6,749,448 | B2 * | 6/2004 | Bright | G02B 6/4201 439/152 |
| 7,513,693 | B2 * | 4/2009 | Wang | G02B 6/3897 385/56 |
| 9,146,366 | B2 * | 9/2015 | Koutrokois | G02B 6/4246 |
| 9,276,358 | B2 * | 3/2016 | Ista | H01R 13/62905 |
| 9,568,690 | B2 * | 2/2017 | Ista | G02B 6/3807 |

* cited by examiner

*Primary Examiner* — Xuong Chung Trans
(74) *Attorney, Agent, or Firm* — IP Informatics; Campbell A. Yore

(57) ABSTRACT

The invention described herein includes a pluggable transceiver module comprising a release mechanism for decoupling the module from a computer connection port. In one embodiment, the module release mechanism comprises a release structure having integrated flexure and linking members. The integrated flexure and linking members may be configured to facilitate locking the module in a computer connection port to prevent a small unintentional force from unseating the module and disturbing the module's electrical and optical connections. The release structure may be configured to unlock the module from a computer connection port by displacing a latch feature disposed in a cage assembly inside a computer connection port.

20 Claims, 11 Drawing Sheets

PLUGGABLE TRANSCEIVER MODULE WITH INTEGRATED RELEASE MECHANISM

FIELD OF INVENTION

The present invention relates generally to electronic modules and optical devices. More particularly the invention relates to fiber optic module release mechanisms.

BACKGROUND

Computers and related peripheral equipment, as well as satellite and communication systems evolve extremely rapidly. These systems require ever increasing data transfer rates to drive the systems, such as digital signal processing, image analysis, and communications. With current data demands, optical couplers are used to transfer signals over short and long distances between computers, between two circuit boards in one computer, and even between multiple chips on a single printed circuit board. The use of high-speed optical signals in place of electrical interconnections increases the achievable data transfer rate. Ethernet is an example of a wired technology that transmits data by interfacing with optical systems through a variety of media including backplanes, twisted pair cable, twinax, multimode fiber and single-mode fiber.

To achieve higher data transfer rates, the density of optical arrays must be increased. Increasing density requires smaller optical arrays and more precise axial alignment of emitter and detector in fiber connections. As a result, the mechanical connection means of establishing and maintaining these precise connections are becoming more complex and increasingly important. Fiber optic connectors are therefore of great interest in the current art. As such, improvements are always welcome in the ease of manufacturing, installing, maintaining, and upgrading such connectors.

A pluggable transceiver module is an optical transceiver that typically houses both light emitting devices such as vertical cavity surface emitting lasers (VCSEL's) and light detecting devices such as photodiodes in a mechanical housing that can be removably attached to a computing device such as a circuit board or PCB. Driver and receiver circuitry modules, typically in the form of application specific integrated circuit (ASIC) chips, include driver circuitry for receiving electrical signals from one device and driving VCSEL emission in response. The ASIC also includes receiver circuitry for receiving signals from the photodiodes and, in response, processing said signals into an appropriate output. The combination of the VCSEL's, the photodiodes, ASIC circuitry, and mechanical housing is referred to as an optical transceiver.

SUMMARY OF THE INVENTION

An example of the present invention is an transceiver module having a module connection port for receiving an MPO type optical plug in a port communicatively coupled to a fiber optic transceiver module housed in a cage or connector assembly that is permanently mounted to a printed circuit board (PCB). Other examples have module connection ports for receiving a cable or optical connector, for example a Registered Jack (RJ45), Multiple Fiber (MPO, MTP, MXC, LC, dual LC, SC, or ST), or a connectorless interface that connects a module to a cable or one or more strands of a fiber optic bundle.

Precise release mechanisms for transceiver modules are imperative for data integrity because they ensure proper alignment of electrical and optical connections between modules and host computing devices during data transmission and receiving. Moreover, for safe module extraction, it is also important that users know whether or not the module connection port is in use before removing modules from connection ports. Since there are many types of standardized pluggable transceiver modules currently available and data centers are consistently looking to become more efficient by upgrading and optimizing their data transmission infrastructure, reliable, modular mechanical components that are easy to manufacture, assemble, install, and upgrade are in high demand.

The release mechanism described herein provides many unique advantages over the prior art in this field including a greater compatibility, simpler design, fewer manufactured components, and easier assembly and installation.

It is an object of the present invention to provide a module comprising a release mechanism that provides a locking position and a means to move the module from the locking position to a released position.

It is another object of the present invention to provide a release mechanism that relies on translational movement and limits rotational motion.

It is another object of the present invention to provide a release mechanism attached to a release tab with a one-piece construction for easier assembly and greater interoperability.

It is still another object of the present invention to provide a release mechanism that minimizes manufactured components.

It is still another object of the present invention to provide a release mechanism that has a one-piece release structure.

It is still another object of the present invention to provide a release mechanism that is assembled on the outside of the module housing after the module's mechanical closure has been assembled.

It is still another object of the present invention to provide a foolproof positive check on inadvertent removal of the transceiver module while the electro/optical media received in the module connection port are still in place.

The present invention is a pluggable transceiver module designed to achieve the above objectives. The pluggable transceiver module may be a form factor, for example, a Quad Small Form-factor Pluggable (QSFP), a Small Form-factor Pluggable (SFP), Octal Small Form-factor Pluggable (OSFP), C Form-factor Pluggable (CFP), or other pluggable optical module.

The module described herein comprises a release mechanism used to release the transceiver module from a computer connection port that may be permanently mounted on PCB or otherwise communicatively coupled to a computing device. The pluggable transceiver module of the present invention is designed to interface with many computer connection ports including QSFP type ports, for example, a QSFP, QSFP+, QSFP14, QSFP28, QSFP56, QSFP-DD, or μQSFP, SFP type ports, for example, a SFP, SFP+, or SFP28, a Small Form Factor (SFF) casing, OSFP type ports, C form factor type ports, for example, CFP, CFP2, or CFP4, or other computer connection ports configured for at least one of wired, wireless, electrical, or optical links.

The computer connection port may be coupled to many types of computing devices including at least one of standalone or networked computers, messaging devices, data communication devices, internet devices, or other computing devices or systems. The pluggable transceiver module also includes a release mechanism comprising a release tab for actuating a release structure on the transceiver module. The release structure includes a locking feature that engages a latch structure disposed in a computer connection port to secure the module inside the port. The release structure disengages the module from the computer connection port by translating on the module body and displacing the latch structure inside the port from the locking structure on the module.

The release structure shifts from a latched position to unlatched position by moving along at least one surface of the module body. In some embodiments, the release tab is actuated by a lifting tab positioned on the top or underside of the module body. Release tabs may comprise one more release tab arms running along on or more module side surfaces. In one example, the release arm has a step or tab on the end for displacing a latch contained in a cage assembly disposed in a computer connection port.

When the release structure is in a latched position, the transceiver module is fully seated in the connection port and a locking mechanism secures the module body in place. When the release structure is translated to the unlatched position, the locking mechanism is disengaged and the transceiver module is released from the connection port. Absent application of an external force, a flexure member keeps the release structure in a latched position to ensure the transceiver module is secure and maintains proper axial alignment inside the connection port.

In one example, the locking mechanism comprises at least one locking structure attached to the module body. The at least one locking structure engages a latch structure on at least one side of the module housing. When the release mechanism is actuated, a step on the release structure is urged upward by a trailing edge of the locking feature. As the step moves forward and upward, it moves the latch structure on a cage disposed in a computer connection port upward. This motion disengages the latch structure on the cage from the locking feature on the module housing and releases the transceiver module from the computer connection port.

In another example, when the release mechanism is actuated, two lifting members, one at each end of two release arms extending out from the main portion of the release structure, are urged forward as the release structure translates on the module body. As the locking features move forward, they displace latch structures on each side of a cage disposed in a computer connection port. This motion releases the transceiver module from the computer connection port allowing the module to be extracted from the port.

The pluggable transceiver module described herein also includes a flexure member. In general, the flexure member is any structure that contributes a finite amount of force to return the release structure to a home position. In some embodiments, the home position is a latched position. In other examples, the home position may correspond to an unlatched position. Additionally, some release structures include one or more sets of flexure members and linking members while other release structures have combined or integrated flexure and linking members. Some flexure member embodiments include springs, for example, compression springs, leaf springs, torsion springs, coil springs, balance springs, cantilever springs, or wave springs. Alternative flexure member examples comprise structures that deform under mechanical stress and return to their original shapes upon relaxation.

In a preferred embodiment, the flexure member is integrated into the release structure and connected to the module body by a linking member. The linking member fixes a portion of the flexure member to the module housing, while other unfixed portions of the flexure member move relative to the module housing. In this example, as the release structure translates from a latched to unlatched position, the flexure member deforms into a flexed position. When an external force for moving the release structure is eliminated, the flexure member yields mechanical energy as it transitions from a flexed to relaxed position. This mechanical energy is transferred to the release structure and returns the release structure to a latched position. Similarly, the flexure member's capacity to resist deformation (the member's stiffness) holds the release structure in the latched position until an external force is re-applied to the system.

In another embodiment, the flexure member is separate from the release structure and combined with the linking member. In this example, the flexure member is stressed by an applied force normal to the side surface of the module body. When the release structure is in a latched position, the flexure member is bent or coiled. As the release structure moves from a latched to an unlatched position, the flexure member deforms, for example, by straightening out or uncoiling, under the applied force. A portion of the work done to deform the flexure member is then conserved and stored in the deformed flexure member as potential mechanical energy. When the applied force is removed from the system, the deformed flexure member's potential energy converts to mechanical energy. As the flexure member reforms, the mechanical energy transfers to the release structure and returns the release structure to its home position. The flexure member's capacity to resist deformation (the member's stiffness) also ensures the release structure maintains its home position absent an applied force.

An advantage of the present invention is that the release mechanism provides a means to smoothly remove the transceiver module from the connection port.

Another advantage of the present invention is that the locking mechanism accurately seats the transceiver module in a computer connection port.

Still another advantage of the present invention is that it provides a safeguard against premature removal of the transceiver module.

Still another advantage of the present invention is that the release mechanism provides a means to smoothly remove the transceiver from a connection port by translating the release structure.

Still another advantage of the present invention is that the release structure is a simple and easy to manufacture one piece design.

Still another advantage of the present invention is that the release structure does not have a discrete flexure member component separate from the release structure.

Still another advantage of the present invention is that the release structure can be assembled to the module housing at the final stage of the assembly process.

Still another advantage of the present invention is that the release structure can be removed from the module housing without disassembling the module.

Still another advantage of the present invention is that the release structure can be replaced without disassembling the module.

Still another advantage of the present invention is that the release structure is compatible with any module housing that complies with a standardized specification, for example, the transceiver module housing specifications defined in one or more multisource agreements (MSAs).

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
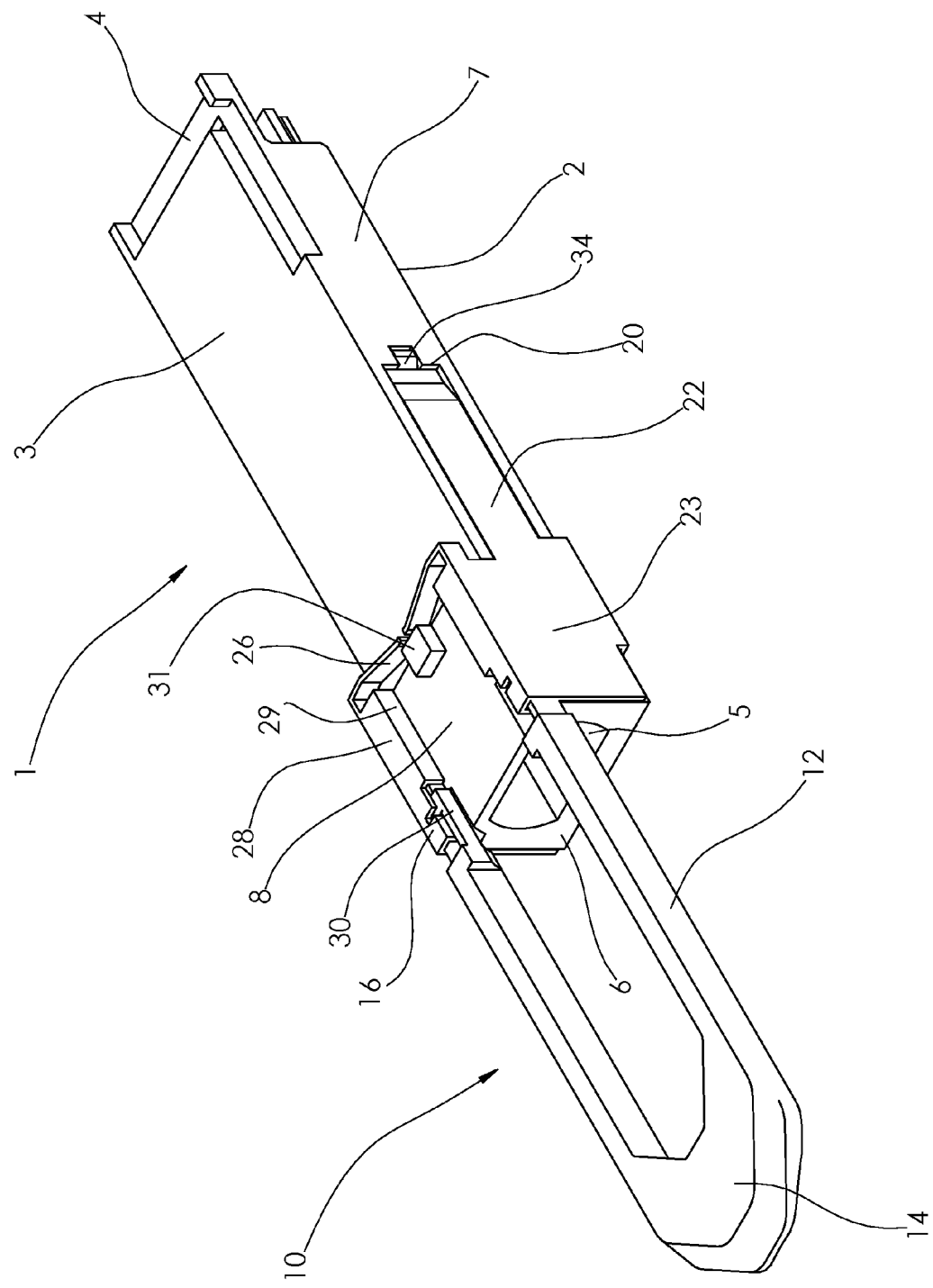
FIG. 1 illustrates one pluggable transceiver module embodiment having a release structure with a combined flexure and linking member. The module is shown in a latched position.
Figure 5:
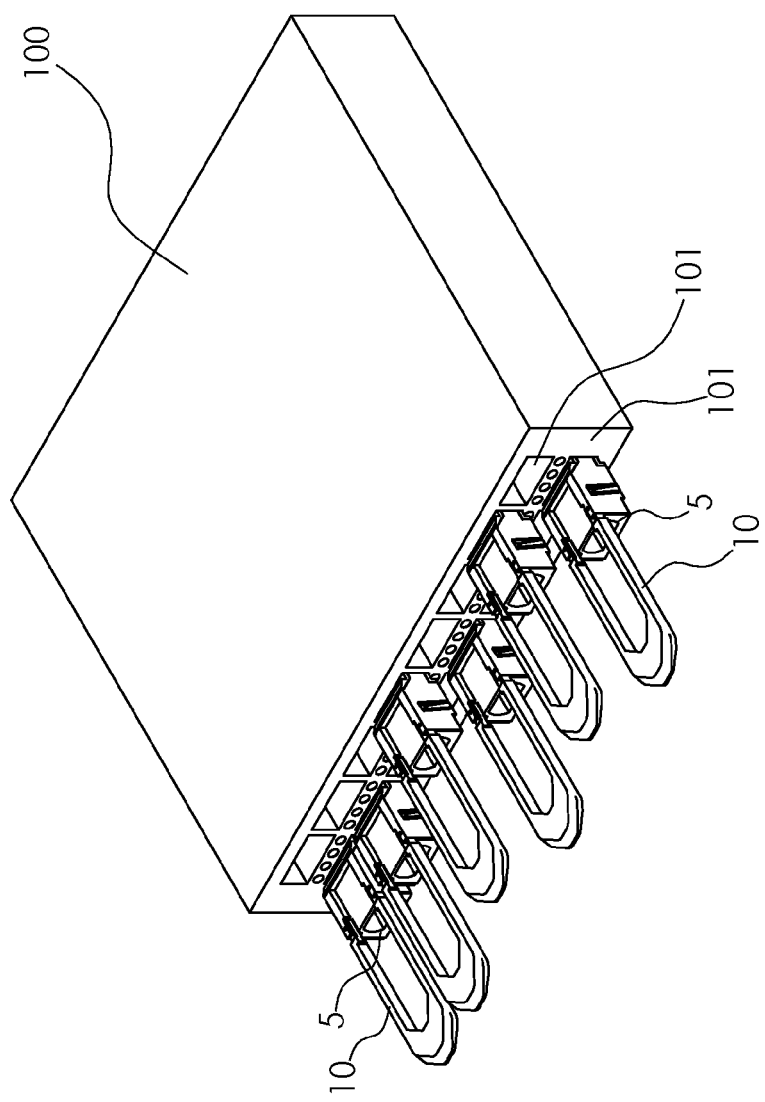
FIG. 5 shows a plurality of pluggable transceiver modules disposed in connection ports contained within a line card component of a computing device.

The pluggable transceiver module described herein is a six-sided rectangular cuboid. FIG. 1 depicts one example pluggable transceiver module in a home position with the combined linking and flexure member 26 in a relaxed position and the release structure 23 in a latched position. The transceiver module comprises a module body 1 having a first end portion 4 configured to fit into a computer connection port. The first end portion 4 facilitates transmission of electrical signals between the pluggable transceiver module and a computing device by aligning one or more contact areas on the terminal end of the first end portion 4 with a computer connection port coupled to a computing device. In one example, the computer connection port is a cage assembly contained in a line card permanently mounted to a printed circuit board (PCB). FIG. 5 provides a more detailed view of a cage assembly for disposing pluggable transceiver embodiments.

The pluggable transceiver module further comprises a second end portion 8 opposite the first end portion 4. The second end portion 8 having a movable or fixed module connection port 5 disposed inside the module body 1 and a connection surface 6 defining the port's opening. The module connection port 5 and connection surface 6 can interface with a cable or optical connection, for example, a Registered Jack 45 (RJ45), Multiple Fiber Push On (MPO), Multiple Fiber Pull Off (MTP), MXC, LC, dual LC, SC, ST, or connectorless interface that connects the module to a cable or one or more strands of a fiber optic bundle.

In one embodiment, the second end portion 8 facilitates transmission of optical and/or electrical signals between a signal medium, for example, a fiber optic bundle or electrical cable, and the pluggable transceiver module by ensuring the cable plug in the module connection port 5 is properly aligned with at least one active area inside the module. Proper alignment is an essential component of fiber optic technology because the light carrying region or core of an optical fiber can be quite small and alignment between this region and other components, such as, LEDs, laser diodes, for example, fabry-perot (FP), distributed feedback (DFB), and vertical cavity surface emitting (VCSELS), diode chips, for example, LED, FP, DFB, and VCSEL chips, photodetectors, photodiodes, and optical receivers require extreme accuracy to efficiently transmit and/or receive signals. In single-mode optical fibers, for example, the core diameter of each fiber is about eight microns, and the laser to fiber alignment is typically required to be within plus or minus 0.5-1 micron. By securing the cable or fiber bundle in an aligned position, the second end portion 8 allows the pluggable transceiver module to receive and transmit electrical and/or optical signals through an electrical cable or fiber optic bundle.

The pluggable transceiver module further comprises at least one locking feature 20. The locking feature 20 ensures a working junction is maintained between the pluggable transceiver module and a computing device by preventing detachment of the pluggable transceiver module from a computer connection port.

In this example, a locking feature 20 is included in both module side surfaces 7. In other embodiments, a locking feature 20 is attached to the module's top surface 3, bottom surface 2, or some combination. The locking feature 20 comprises a step for catching a latch structure disposed in a computer connection port coupled to a computing device. When the latch structure falls into recess behind the locking feature 20, the module body sits secured and properly aligned in a computer connection port, thereby maintaining the electrical connection between the computing device and pluggable transceiver module.

Figure 2:
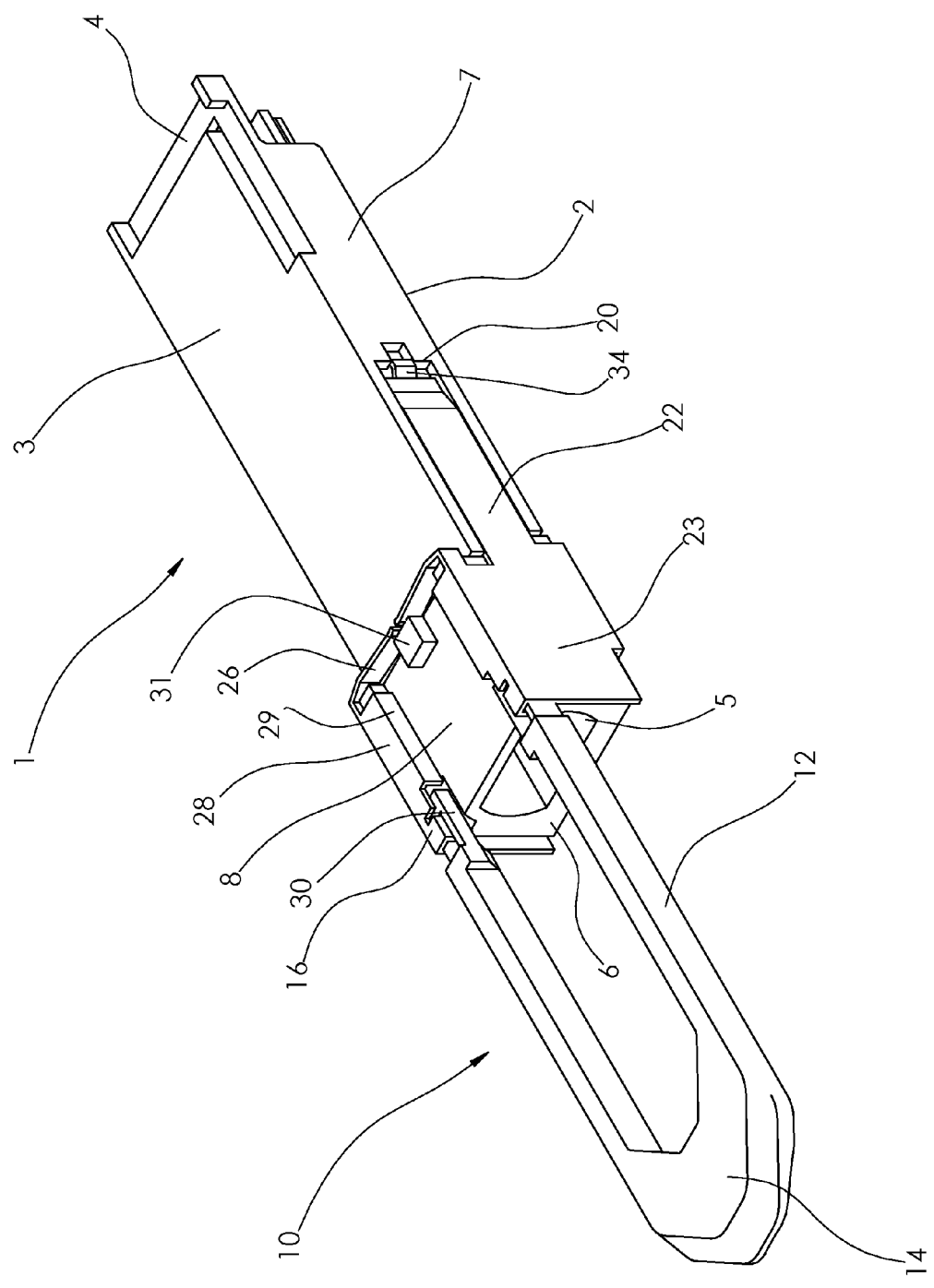
FIG. 2 illustrates one pluggable transceiver module embodiment having a release structure with a combined flexure and linking member. The module is shown in an unlatched position.

The pluggable transceiver module further includes a release structure 23 for detaching the module from an optical or electrical connection port. In this example, the release structure 23 is movable on the module body and comprises a combined flexure and linking member 26. Absent an applied force, the combined flexure and linking member 23 keeps the module in a home position, wherein the release structure is in a latched position and the module locks into a computer connection port. Moving the release structure 23 along the module housing from the latched position to an unlatched position, as shown in FIG. 2, places the module in an unlocked position and allows extraction of the module body 1 from a computer connection port. Accordingly, one locks or unlocks the module from a computer connection port by changing the position of the release structure 23 relative to the module body 1.

The release structure 23 is assembled on the exterior of the module body 1 and attaches around the second end portion 8. In one example, the top surface of the release structure 28 comprises a narrow portion 29 overhanging each side of the release structure 23. The overhanging portions 29 fit around grooves running along the outer edges of the second end portion 8 to attach the release structure 23 to the module's top surface 3. In this embodiment, two release arms 22 extend out from the release structure's main portion to further secure the release structure 23 to the module body 1 by attaching to the module's side surfaces 7. Other embodiments comprise one or more release arms extending out from the release structure's main portion. In these examples, the release arm may attach to at least one underside, side surface, top surface, or some combination of module body surfaces.

Figure 3A:
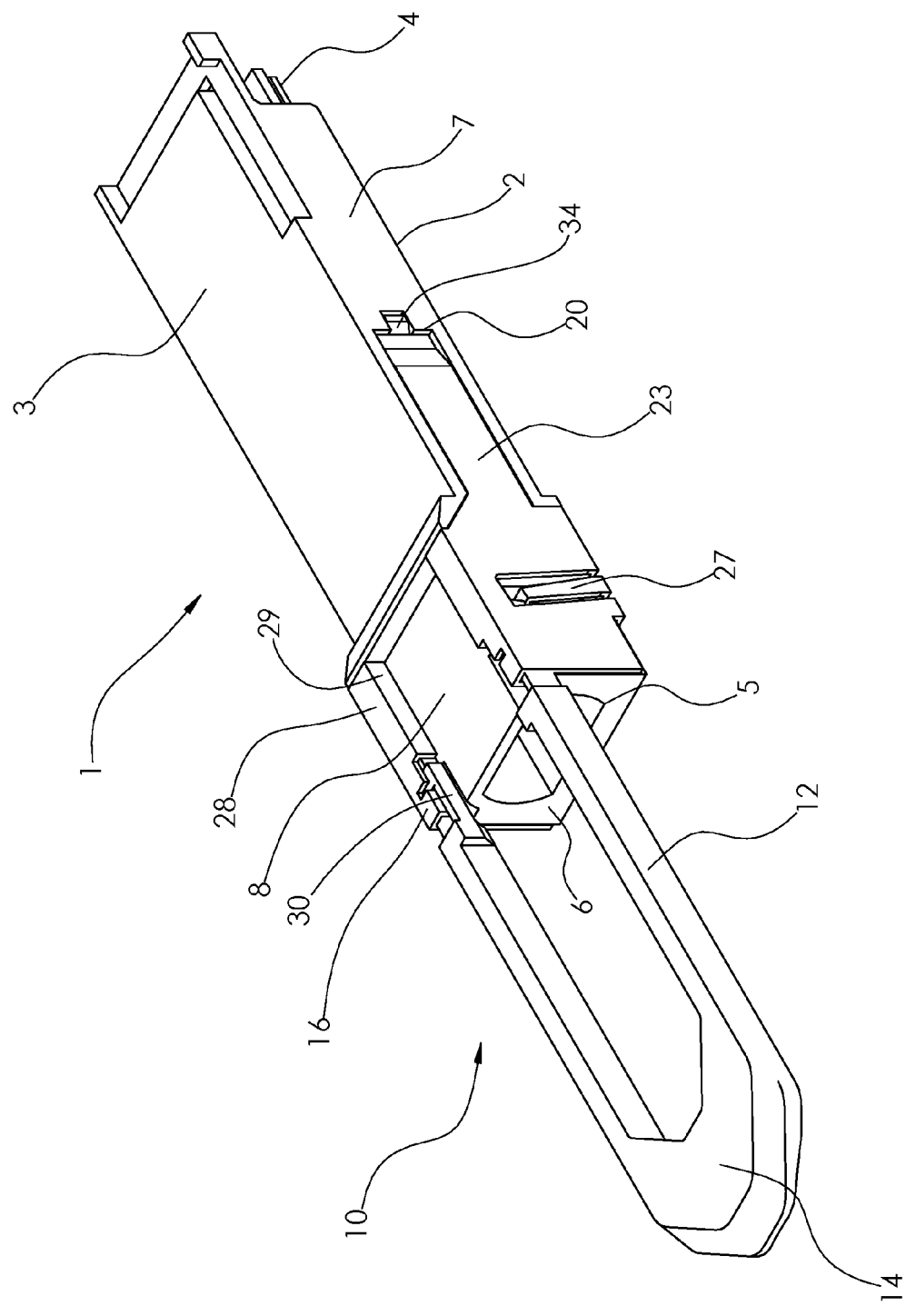
FIG. 3A illustrates one pluggable transceiver module embodiment having a release structure with an integrated flexure member. The module is shown in a latched position.
Figure 3B:
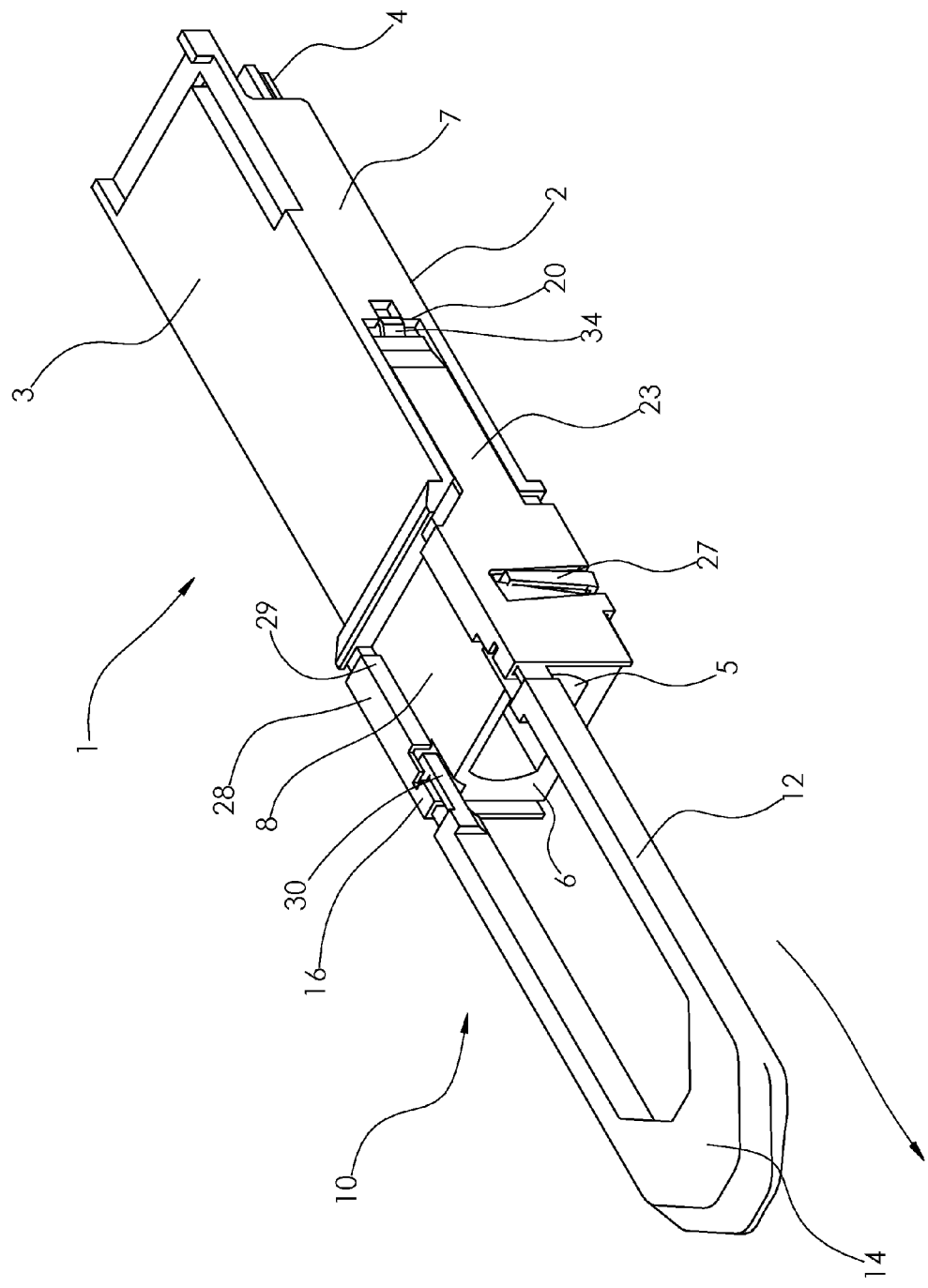
FIG. 3B illustrates one pluggable transceiver module embodiment having a release structure with an integrated flexure member. The module is shown in an unlatched position.
Figure 3C:
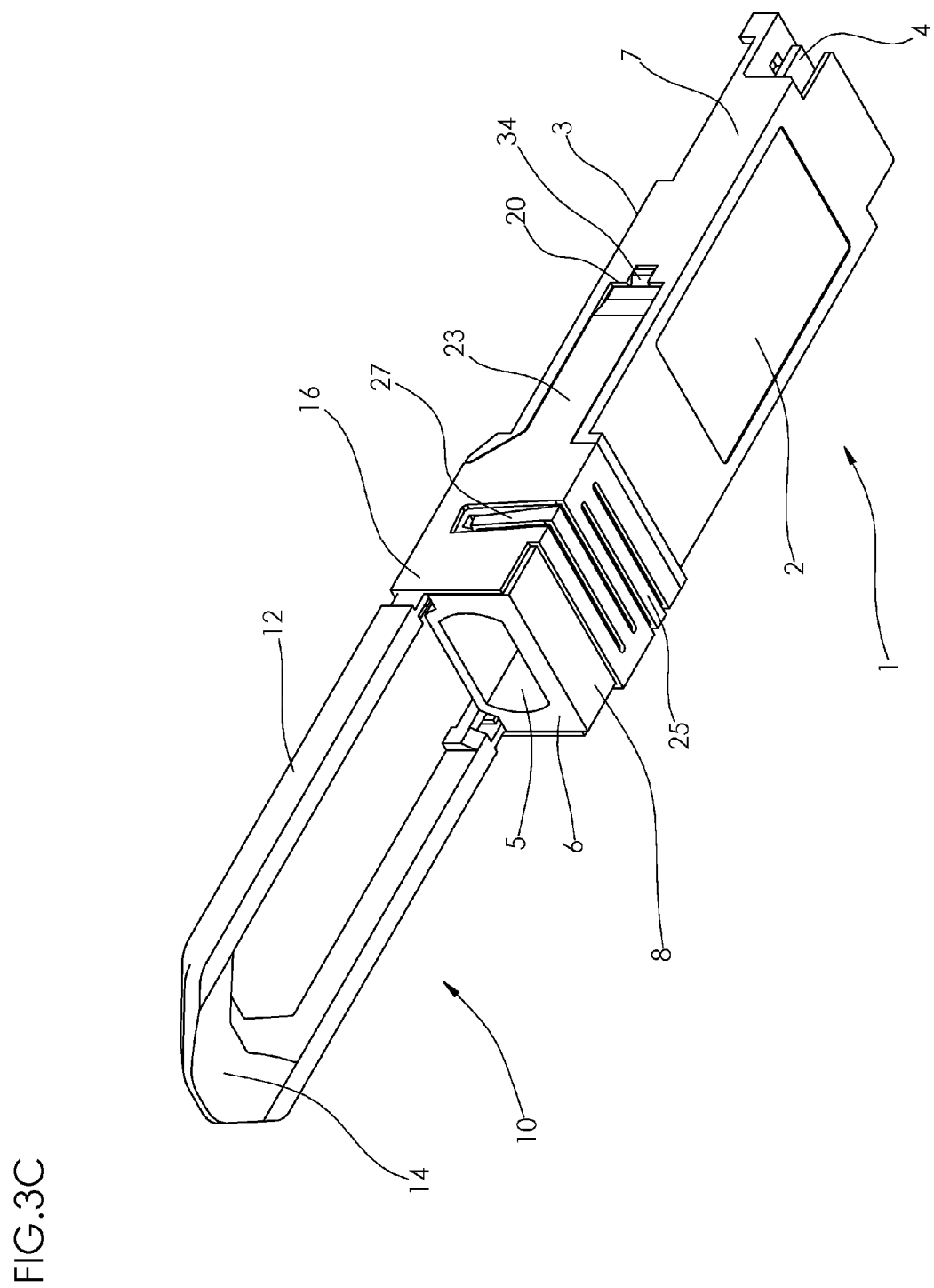
FIG. 3C illustrates an alternative perspective of a pluggable transceiver module embodiment having a release structure with an integrated flexure member. The module is shown in a latched position.
Figure 3D:
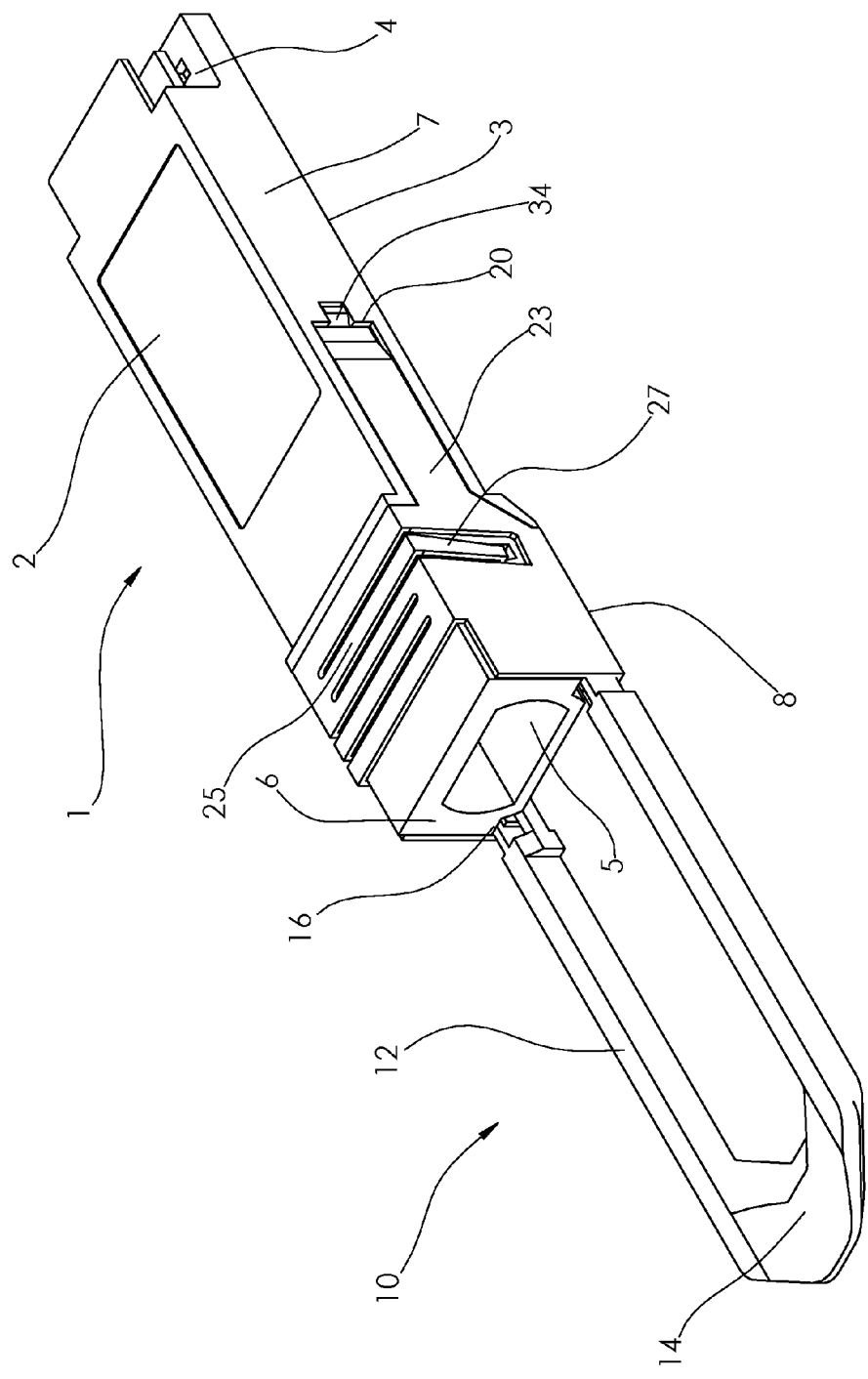
FIG. 3D illustrates an alternative perspective of a pluggable transceiver module embodiment having a release structure with an integrated flexure member. The module is shown in a latched position.
Figure 4:
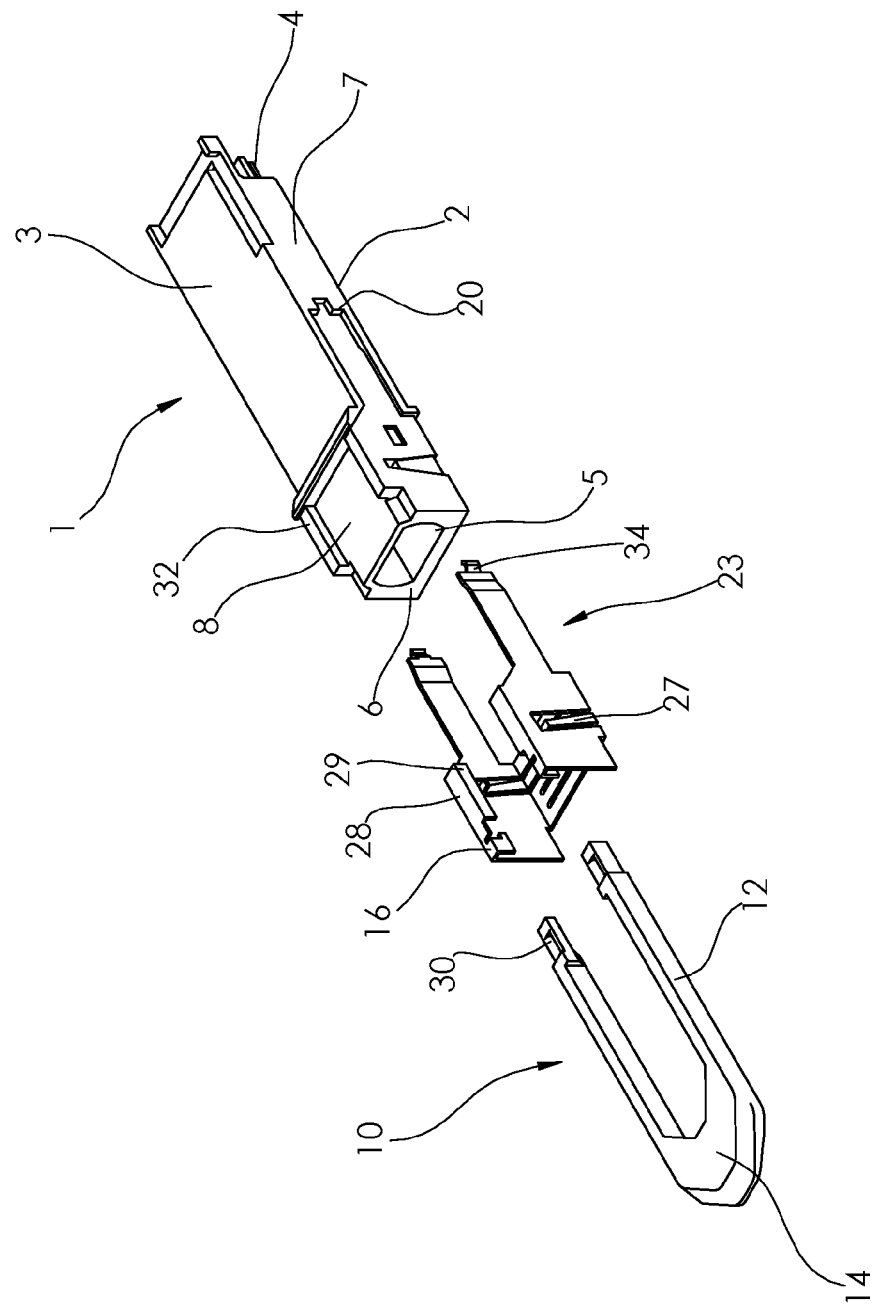
FIG. 4 displays one pluggable transceiver module embodiment with an integrated flexure member. The release structure and release tab components are shown disassembled from the module housing.

In examples shown in FIGS. 1-4, the release structure 23 is actuated by a release tab 10 that attaches to a pair of connection members 16 on the top surface 28 of the release structure 23. In this example, the connection members 16 are positioned along the leading, outer edges of the release structure 23 and comprise the leading most section of the overhanging portions 29 of the release structure's top surface 28. As shown in FIG. 4, the connection members 16 sit in a recessed grove on the module's top surface 3 near the top of the connection surface 6. The shape of the connection members 16 is highly variable and any clip, hook, or tab structure capable fastening to the release tab arms is included in this invention. The connection members 16 of this example are clearly visible in FIG. 4 and comprise an irregular shaped rectangle hook structure with a slightly longer bottom portion. The bottom portion of the connection members 16 is extended to hold the feet 30 on end the release tab arms 12 in the pocket formed by the notched section of the overhanging portions 29 on the top surface of the release structure 28. The length of the extended portion of the connection members 16, however, is limited so that the feet 30 on the end of the release tab arms 12 can receive and contain the connection members 16 when the release tab 10 connects to the release structure 23.

In FIGS. 1-4, the transceiver module comprises a u-shaped release tab 10 having two release tab arms 12 intersecting at a top, curved crossmember 14. The release tab 10 extends out from the module body 1 beyond the terminal of the second end portion 8 closest to the module connection port 5 to provide a structure away from the module connection surface 6 and computer connection port to apply an external force. In this example, the crossmember 14 facilitates extraction of the module from a computer connection port by providing a more accessible surface to grasp or hook the release tab 10 and apply a pulling force. Similarly, the crossmember 14 facilitates insertion of the module by providing a surface to easily grasp or hook the release tab 10 and apply a pushing or translational force to drive the module into a computer connection port. Additionally, should the module become stuck or otherwise hung up, the crossmember 14 also provides a surface to manipulate the module laterally by wiggling it from side to side until the module becomes unstuck or otherwise traverses into the computer connection port.

The release tab 10 can be made of any material suitable for creating relative movement between the release structure 23 and module body 1. The release tab 10 can be attached to the release structure 23 by any means including but not limited to overmolding, welding, clipping, and gluing. Alternatively, the release tab 10 can be combined into the release structure 23 as a one piece or multi-piece design. In this example, feet 30 at the end of the release tab arms 12 opposite the crossmember 14 connect the release tab 10 to the connection members 16 on the release structure 23.

The shape and composition of the feet is highly variable and any flexible or rigid, open or closed, curved or rounded, and metallic, rubber, or plastic hook, clip, fastener, screw, or tab structure capable of securing to the connection members 16 are included in this invention. In this example, to secure the release tab 10 to the release structure 23, a flexible plastic foot 30 at end of each release tab arm 12 fits over and around connection points 16 on the release structure 23. Although the feet 30, in this example, are removable each foot 30 is contained in a pocket on the top surface of the release structure 28. The pocket corresponds to the gap between the notch in the top overhanging portion 29 of the release structure's top surface 28 and the extended bottom portion of the connection points 16. By keeping the release tab 10 secure on release structure 23 while the module body 1 is inserted into- and extracted from-a computer connection port by applied forces, the pocket helps facilitate actuating the module's release structure 23.

FIG. 1 further comprises a combined linking and flexure member 26 attached to the top surface of the module body 3 and extended out from the top overhanging portions 29 of the release structure 23. In this example, the combined linking and flexure member 26 extends from the end of the release structure 23 opposite the connection members 16 toward an anchor 31 in middle portion of the module's top surface 3. In this example, the combined linking and flexure member 26 couples the release structure 23 to a flexure member so that the flexure member's rigidity can maintain the release structure 23 in its home position absent application of an external force. By keeping the release structure 23 in its home position, the combined linking and flexure member 26 ensures the module body 1 is properly aligned in a computer connection port until an applied force releases the module from the port by actuating the release structure 23.

Home position of the release structure 23 may refer to a latched or unlatched position. In this example, the release structure's home position is a latched position having the module body 1 in a locked position. The module's locked position comprises a lifting member 33 on the end of the release tab arm 22 opposite the module connection surface 6. The lifting member 33 configured to be assembled on- or slide into a groove cut in-one or more module housing surfaces so that the lifting member 33 can be seated behind a latch feature when the module is locked in a computer connection port. The module is locked in a computer connection port when a latch feature inside the port falls into recess behind the locking structure 20 on the module housing.

In one example, the combined linking and flexure member 26 curves inward toward an anchor 31 in the center of the module body when the release structure 23 is in a home position. As an applied force translates the release structure 23 away from its home position, the combined linking and flexure member 26 deforms around the anchor 31 in the center of the module body from a curved shape to a more horizontal orientation. In some embodiments, the combined linking and flexure 26 member deforms to a horizontal orientation that is perpendicular to the module's side surfaces 7. In other embodiments, the combined linking and flexure member 26 deforms to a horizontal orientation that is just past perpendicular or nearly perpendicular relative to the module's side surfaces 7.

In this embodiment, the combined linking and flexure member 26 is curved when in a relaxed position and the release structure 23 is in its home position. In other embodiments, the combined linking and flexure member 2 is horizontal when in a relaxed position and the release structure 23 is in its home position. In still other embodiments, the flexure portion of the combined linking and flexure member 26 may include one or more springs, for example, a coil, leaf, compression, torsion, balance, cantilever, or wave springs. Additionally, it is to be understood that flexure portions of this invention may be combined with one or more linking members or otherwise joined to the release structure 23 in a variety of ways.

To release the pluggable transceiver module shown in FIGS. 1-2 from an electrical or optical connection, the release tab 10 is pulled laterally away from the first end portion 4. In one example, pulling the release tab 10 horizontally out from a computer connection port translates the release arms 22 along the sides of the module body 7 so that the lifting members 33 on the end of the release tab arms 22 displace the latch structures contained the cage assembly disposed in a computer connection port. By lifting the latch structures from recessed positions behind the locking features 20, the release structure 23 releases the module body 1 from the computer connection port. The release tab 10 can also function other than to insert or extract the module. Accordingly, not every movement applied to the release tab 10 will result in locking or unlocking the module. Instead, movements with specific directions and amplitudes such as the example described above will result in locking and unlocking the module from the connection port.

In this example, after the module has been released from the computer connection port additional force must be applied to extract the module from the computer connection port. If no additional force is applied after the module is released, then the combined linking and flexure member 26 will return the module to the latched position by reverting from its straight, flexed position to its curved, relaxed position. By way of being joined to the release member 23 by a linking portion, the mechanical energy released by the combined linking and flexure member 26, as it reforms a home, relaxed position, translates to the release structure 23 and thereby moves the release structure 23 from a unlatched position to a latched position. Without an additional force to pull the module out of the computer connection port while the release structure 23 is unlatched, the rigidity of the combined linking and flexure member 26 returns the release structure 23 to its latched position. Re-latching the release structure 23 moves the lifting members 33 back in front of the latch structures disposed in the computer connection port, thereby allowing the latch structures to fall back into recess behind the locking features 20.

FIG. 2 illustrates the pluggable transceiver module of FIG. 1 in an unlocked position with the combined linking and flexure member 26 in a flexed position and the release structure 23 in an unlatched position. The deformed flexure members extending toward the center portion of the module body 3 characterize the flexed position of the combined linking and flexure member 26. The forward movement of the release arms 22, as shown by the unfilled groove cut in the module's side surface 7 just behind the lifting member 33, indicates the release structure 23 is in an unlatched position. FIG. 2 displays the transceiver module under the stress of a force applied to the release tab 10. This applied force actuates the release structure 23 by translating the release tab 10. Actuating the release structure 23 releases the module from a computer connection port by displacing one or more latch structures disposed in a computer connection port from a recessed position behind one or more locking features 20. This illustration contrasts with FIG. 1, which displays the transceiver module in a locked position. No pulling force has been applied to the release tab 10 in FIG. 1, therefore, the release structure 23 is not actuated and the combined linking and flexure member 26 is in a relaxed position.

FIGS. 3A-3D illustrate another preferred embodiment of the pluggable transceiver module described herein. FIG. 3A displays the module in a locked position, wherein the release structure 23 is in a home position and the flexure member 25 is in a relaxed position. FIG. 3B displays the module in an unlocked position, wherein the release structure 23 is in an unlatched position and the flexure member 25 is deformed. FIG. 3C displays the module's bottom surface 2 to better illustrate the release structure 23 with integrated flexure 25 and linking members 27. FIG. 3D shows an alternative perspective of the module with the bottom surface 2 shown on top of the top surface 3 to further illustrate the release structure 23 with integrated flexure 25 and 27 linking members.

The example shown in FIGS. 3A-3D is compatible with a variety of networking media. For example, the module connection port 5 and connection surface 6 may be configured to receive a cable or optical connection, for example, a Registered Jack 45 (RJ45), Multiple Fiber Push On (MPO), Multiple Fiber Pull Off (MTP), MXC, LC, dual LC, SC, ST, or connectorless interface that connects a module to a cable or one or more strands of a fiber optic bundle. Additionally, the release structure 23, integrated linking member 27, and integrated flexure member 25 may be configured for use with a wide variety of transceiver modules, for example, QSFP type modules including QSFP, QSFP+, QSFP14, QSFP28, QSFP56, QSFP-DD, and μQSFP modules, SFP type modules including SFP, SFP+, and SFP28 modules, and, C form factor type modules including, CFP, CFP2, and CFP4 modules.

The pluggable transceiver module embodiment shown in FIGS. 3C-3D comprises a release structure 23 with an integrated flexure member 25. The flexure member 25 is integrated into a one-piece release structure design and is not a separate piece. Accordingly, the release structure 23 involves fewer distinct parts and is easier to manufacture, assemble, install, and upgrade relative to transceiver modules with separate release structure and flexure member components. To further simply manufacturing, assembly, installation, and replacement, the linking member 27 has also been integrated into the release structure 23 so that it is part of the one-piece design and not a separate component.

In this example. the release structure 23 with integrated linking 27 and flexure 25 members attaches to the exterior of the module body 1 around the second end portion 8. As shown in FIG. 4, the release structure 23 comprises a top surface 28 with a narrow portion overhanging 29 each side surface. To attach the top surface 28 of the release structure to the module housing, the overhanging portions 29 slide into grooves 32 running along the outer edges of the second end portion 8 on the module body 1. Release arms 22 further secure the release structure 23 to the module body 1 by attaching to the module's side surfaces 7. Once assembled on the module housing, the release structure 23 is movable on the module body 1 by pulling a release tab 10.

In this example, the flexure member 25 comprises a segmented piece of sheet metal on the underside of the main portion of the release structure 23. The flexure member 25 comprises a fixed portion including two fixed segments and a moveable portion including two moveable segments. Other flexure member embodiments may be configured to have a fewer or greater number of segments having the same or different dimensions. It is too be understood that all externally mounted flexure members comprising at least one flexible segment capable of storing potential mechanical energy when deformed under stress are within the scope of this invention.

In the embodiment shown in FIGS. 3C-3D, the flexure member 25 comprises five segments. The two fixed segments are included in the member's fixed portion and the three moveable segments are included in the member's moveable portion. When an applied force translates the release structure 23 on the module body 1, the movable portion moves freely with the release structure 23. The fixed portion, however, flexes and deforms as the release structure 23 is translated due to a linking member 27, that extends down from the middle flexure member segments, securing the fixed portion of the flexure member 25 to the module housing. By selectively securing the fixed portion of the flexure member 25 without impeding the movement of the movable portion and the rest of the release structure 23, the linking member 27 ensures an applied force that moves the release structure 23 also deforms the flexure member 25. The deformed flexure member 25 stores potential mechanical energy that converts to mechanical energy transferred to the release structure 23 when the applied force is removed and the flexure member 25 reforms. The mechanical energy transferred from the flexure member 25, moves the release structure 23 back to a home position. Similarly, the flexure member's 25 resistance to deformation (the member's stiffness) keeps the release structure 25 in a home position absent an applied force.

The linking member 27 may also be configured to limit movement of the release structure 23 on the module housing. In this embodiment, the linking member 27 is positioned in front of the rear portion of the release structure 23 so that the rear edge of the linking member contacts the leading edge of the release structure 23. In this configuration, the position of the linking member 27 prevents the release structure 23 from moving beyond the linking member 27 on the module housing. This orientation limits the release structure's forward movement and thereby ensures the release structure 23 does not translate farther than necessary to unlock the module. In other examples, the release structure 23 may be configured to move beyond or around the linking member 27. Additionally, other portions of the release structure 23, linking member 27, flexure member 25 or some combination may be configured to otherwise regulate the movement of the release structure 23 on the module housing.

Home position may refer to any latched or unlatched position of the release structure 23 or any locked or unlocked position of the pluggable transceiver module. In this example, the release structure 23 is in its home position when it is in a latched position and the module is in a locked position. When the module is in a locked position inside a computer connection port, the module's electric or optical connection is fully seated in the port allowing for optical and electrical signals to flow between the module and a computing device. Accordingly, the flexure 25 and linking 27 members are essential for maintaining data integrity because they allow continuous transmission of electrical and optical signals across network infrastructure by keeping transceiver modules and other optical and/or electronic devices fully seated and locked into computer connection ports.

In this example, the release tab 10 comprises u-shaped structure having two release tab arms 12 intersecting a top, curved crossmember 14. The release tab 10 can be made of any material suitable for creating relative movement between the release structure 23 and module body 1. The release tab 10 can be attached to the release structure 23 by any means including overmolding, welding, clipping, and gluing. Alternatively, the release tab 10 can be combined into the release structure 23 as a one piece or multi-piece design. In this example, feet 30 at the end of the release tab arms 12 opposite the crossmember 14 connect the release tab 10 to the connection members 16 on the release structure 23.

The shape and composition of the feet 30 is highly variable and all flexible rigid, open, closed, curved, rounded, metallic, rubber, plastic, or some combination of hook, clip, fastener, screw, tab, foot, or some combination of structures capable of securing to the connection members 16 are included within the scope of this invention. In this example, the release tab 10 secures to the release structure 23, by fitting a flexible plastic foot 30 at the end of each release tab arm 12 over and around a set of connection members 16 on the release structure 23. The feet 30 are removable but snuggly contained in a pocket on the top surface 28 of the release structure. The pocket, formed by a notch in the overhanging portion 29 of the release structure's top surface 28 and an extended bottom portion of the connection members 16, keeps the release tab 10 secure on release structure 23 while forces applied to the release tab 10 actuate the release structure.

To release the module from a computer connection port, an applied force translates the release tab 10 away from the module body 1. The applied force on the release tab transfers to the release structure 23 translating the structure forward on the module body 1. As the release structure 23 translates forward, the lifting member 33 on the end of each release tab arm 22 lifts and displaces a latch structure disposed in a computer connection port from a recessed position just behind the locking feature 20. Conversely, using the lifting member 33 to disengage the latch feature from the locking feature 20 on the module housing releases the module from the computer connection port and allows extraction of the module.

In addition to translating the release structure 23, the applied force deforms the flexure member 25. The deformed flexure member 25 stores potential mechanical energy that is converted to mechanical energy and transferred to the release structure 23 when the applied force is removed from the system. As the flexure member 25 reforms absent the applied force, the mechanical energy transferred from the flexure member 25 returns the release structure 23 to a home position. Additionally, the flexure member's rigidity provides the resistance necessary to hold the release structure 23 in a latched position absent application of force to the release tab 10.

FIG. 4 displays the pluggable transceiver module embodiment of FIGS. 3A-3D with the release tab 10 and release structure 23 disassembled from the module body 1. In this figure, the release structure's three attachment zones on the module body 1 are clearly shown. Zone one includes the grooves 32 and recessed portion on the outer edges of the second end portion 8's top surface. Zone two includes the track cut into module's side surfaces 7 and zone three includes the linking member receiving area cut into the second end portion 8's side surfaces. FIG. 4 also illustrates the feet 30 at the end of the release tab arms 12 that secure the release tab 10 to the release structure 23 by receiving and fitting around the connection members 16. The segments comprising the fixed and moveable portions of the integrated flexure member 25 are also displayed on the underside of the release structure 23.

FIG. 5 displays one example of a plurality of transceiver modules disposed in two rows of computer connection ports. The computer connection port shown in this example is just one type of connection port that is compatible with this invention. Other compatible computer connection ports include QSFP type ports, for example, a QSFP, QSFP+, QSFP14, QSFP28, QSFP56, QSFP-DD, or μQSFP, SFP type ports, for example, a SFP, SFP+, or SFP28, a Small Form Factor (SFF) casing, OSFP type ports, C form factor type ports, for example, CFP, CFP2, or CFP4, and other computer connection ports configured to receive electrical or optical connectors. Similarly, the pluggable transceiver module shown in this example is just one type example of the transceiver modules included in this invention. Other transceiver examples include QSFP type modules including QSFP, QSFP+, QSFP14, QSFP28, QSFP56, QSFP-DD, and μQSFP modules, SFP type modules including SFP, SFP+, and SFP28 modules, and, C form factor type modules including, CFP, CFP2, and CFP4 modules.

FIG. 5 illustrates the module density typically seen in today's state of the art digital communications switches, servers, and routers. The multiple rows of tightly packed optical transceiver modules demonstrate the need for the space efficient release mechanisms described herein. By minimizing the amount of rotational and lateral movement needed to actuate the release structure, the module release mechanisms of this invention encourage higher information bandwidth by supporting digital communication systems with increased module density. Additionally, the release tab 10 of this invention makes module extraction from a high-density port system 100 similar to the one shown in FIG. 5 more practical. By providing an easy-to-grasp, separate structure extended out from the connection ports 101, the release tab 10 makes the release structure more accessible by alleviating the need to reach in-between the modules 5 and connection ports 101 to actuate the release structure, for example, by rotating a bail or pulling a crossmember on the module housing.

Figure 6A:
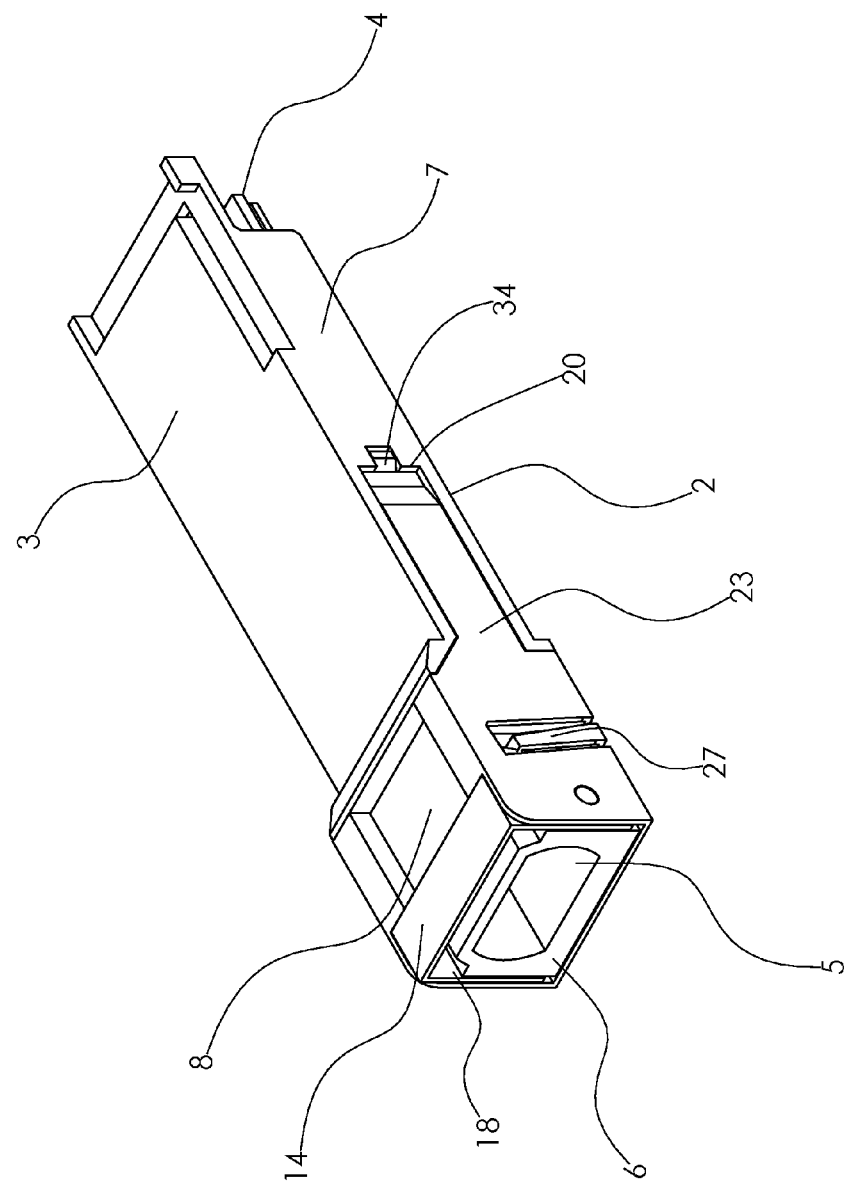
FIG. 6A illustrates one pluggable optical transceiver module embodiment having a rotationally actuated release structure. The module is shown in a latched position.
Figure 6B:
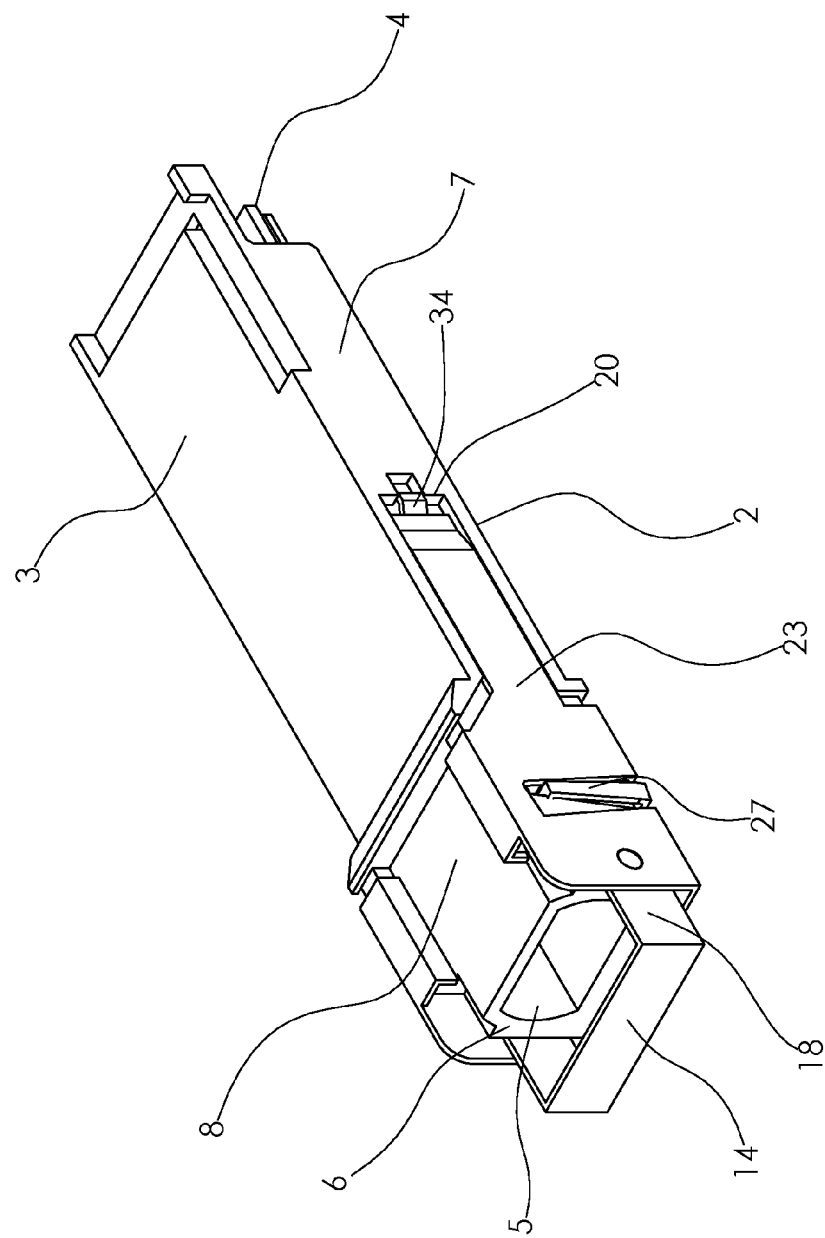
FIG. 6B illustrates one pluggable optical transceiver module embodiment having a rotationally actuated release structure. The module is shown in an unlatched position.

FIGS. 6A-6B illustrate another preferred embodiment of the pluggable transceiver module described herein. FIG. 6A shows the transceiver module in a locked position with a crossmember 14 on the top surface 3 of the module body. FIG. 6B displays the transceiver module in an unlocked position with the crossmember 14 fully rotated in front the module connection port 5 and the release structure 23 moved forward on the module body. In this example, the release structure 23 has integrated flexure 25 and linking 27 members similar to the example show in FIGS. 3A-4. However, instead of a release tab the module comprises a crossmember 14 with a cam member 18 extending down from the crossmember 14 along the side surfaces of the release structure 23. The crossmember 14 and cam member 18 are integrated in a one piece design that mounts to the inner surface of the release structure 23. In other embodiments, the crossmember 14 and cam member 18 can be separate or integrated components that mount to the exterior or are otherwise integrated into the release structure 23. In this example, the crossmember 14 and cam member 18 are fixed to the release structure by a pair of circular rivets that are inserted, one on each side, into the portion of the release structure closest to the module connection port 5 and connection surface 6. In other examples, the crossmember 14 and cam member 18 are fixed to the front portion or other portions of the release structure 23 by a variety of other means including overmolding, clipping, welding or gluing.

In this example, the cam member 18 has a curve cut into its lower portion just below the rivet. This curved portion 33 interacts with a cam geometry 19 to contact and mechanically displace the release structure 23. To release this example module from a computer connection port, an applied force rotates the crossmember 14 up to ninety degrees across the face of the module connection port 5 and connection surface 6. Rotating the crossmember 14 wedges the cam member 18 between the module body 1 and the release structure 23 causing the curved portion 33 of the cam member 18 to contact the cam geometry 19 on the module housing and move the release structure 23 relative to the module body 1. By moving the release structure 23 forward, the cam member 18 displaces the latch structure disposed in a computer connection port with the locking feature 20 at the end of the release arm 22. This allows the module to be extracted from a computer connection port by pulling the module body 1 out from the port. In other embodiments, rotating the crossmember 14 does not wedge the cam member 18 or contact the cam geometry 19. Instead, rotating the crossmember 14 makes actuating the release mechanism 23 easier by providing a grasping surface displaced from a computer connection port opening.

The rotating release mechanisms in this example do not disturb the linking member's 27 ability to secure the flexure member 25. Accordingly, moving the release structure 23 forward relative to the module body 1 deforms the flexure member 25. When the crossmember 14 rotates back to a locked position on the top surface of the second end portion 8, the potential mechanical energy stored in the deformed flexure member 25 is converted into mechanical energy and transferred to the release structure 23. The mechanical energy transferred from the flexure member 25 returns the release structure 23 back to a home position. Similarly, the rigidity provided by the flexure 25 and linking members 27 keeps the release structure 23 in a home position absent an applied force.

Figure 7:
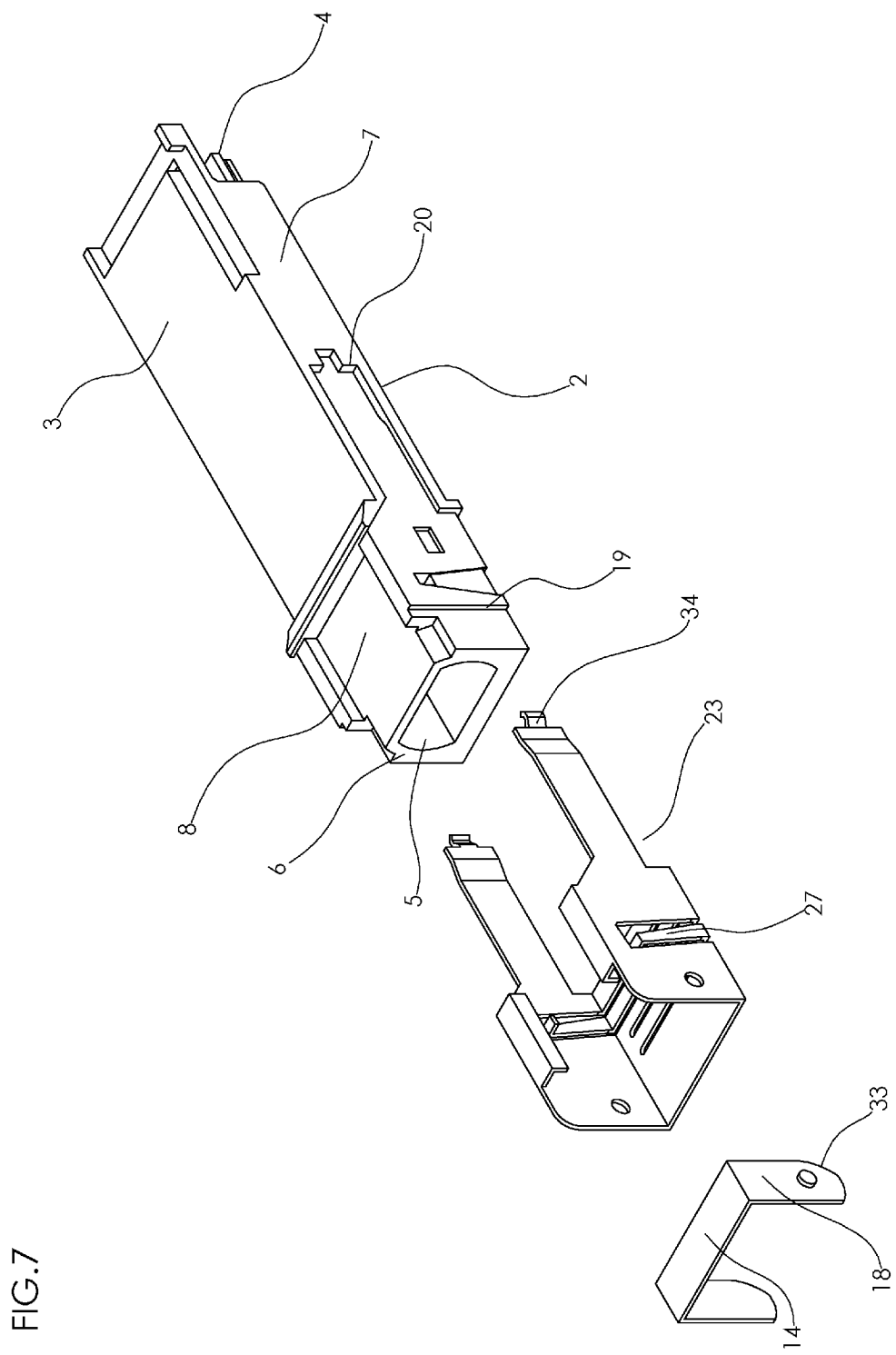
FIG. 7 illustrates one pluggable optical transceiver module embodiment having a rotationally actuated release structure. The release structure and rotating crossmember are shown disassembled from the module housing.

FIG. 7 displays the pluggable transceiver module shown in FIGS. 6A-6B with the crossmember 14 and release structure 23 disassembled from the module body. The rivets for attaching the crossmember 14 and cam member 18 to the release structure 23 are clearly shown in this drawing along with the curved cam geometry 33 cut into the bottom portion of the cam member 18. FIG. 7 also shows the connection members on the top surface of the release structure in FIGS. 1-4 are absent from the module embodiment in FIGS. 6A-7. Additionally, FIG. 7 displays the portions of the cam geometry 33 and linking member 27 that interface when the release structure 23 is actuated.

The features and elements of the invention are well described by the examples and explanations presented above. Those skilled in the art will readily observe that numerous modifications and alterations of the device may be made while retaining the teachings of the invention. Accordingly, the above disclosure should be construed as limited only by the metes and bounds of the appended claims.

I claim:
1. A pluggable transceiver module comprising:
a module housing having a computer connection that aligns with an electrical connection inside a computer connection port, the module housing further having a module connection port opposite the computer connection, the module connection port for receiving a wired connection, the computer connection and module connection port for facilitating transmission of electrical and optical signals;

a release structure comprising:
  an integrated flexure member having a movable portion and a fixed portion, the integrated flexure member configured to provide a force that returns the release structure to a home position;
  an integrated linking member attached to the integrated flexure member, the integrated linking member configured to fix the fixed portion of the integrated flexure member to the module housing, the fixed portion configured to remain stationary on the module housing when the movable portion moves relative to the module housing; and
a release tab connected to the release structure and extended from the module housing, the release tab configured to receive an applied force, the release tab further configured to move the release structure by transferring the applied force from the release tab to the release structure, wherein the release tab is a U-shaped structure comprising:
  at least one release tab arm intersecting a crossmember, the release tab arm configured to make the crossmember more accessible for extraction by extending the crossmember away from the module housing, the crossmember having a grasping surface for receiving an applied force;
  at least one foot attached to the release tab arm opposite the crossmember, each foot having an opening for receiving a connection member on the release structure, the foot configured to secure the release tab to the release structure by fitting around at least one connection member on the release structure.

2. The pluggable transceiver module of claim 1, wherein the connection member is cut into the top surface of the release structure to provide a pocket configured to receive the release tab foot when the release tab joins to the release structure.

3. A pluggable transceiver module comprising:
  a module housing comprising a first end portion opposite a second end portion, the first end portion having a computer connection for aligning with an electrical connection inside a computer connection port, the second end portion having a module connection port for receiving a wired connection, the module housing for facilitating transmission of electrical and optical signals;
  a release structure comprising:
    at least one release arm attached to the module housing and extended away from the module connection port;
    at least one lifting member attached to the release arm, the lifting member configured to prevent detachment of the computer connection from the electrical connection when the module is manipulated inside the connection port, the lifting member further configured to detach the computer connection from the electrical connection by moving on the module housing;
    an integrated flexure member assembled on the outside of the module housing, the integrated flexure member configured to return the release structure to a home position;
    an integrated linking member attached to the integrated flexure member, the integrated linking member configured to fix a portion of the integrated flexure member to the module housing so that the fixed portion of the integrated flexure member remains stationary on the module housing when the release structure moves relative to the module housing; and
  a release tab connected to the release structure and extended away from the module housing, the release tab comprising;
    at least one release tab arm extended in front of the module connection port;
    a crossmember connected to the release tab arm, the crossmember configured to provide a structure to actuate the release structure by applying an external force; and
    at least one foot attached to the release tab arm opposite the crossmember, the foot having an opening for receiving a connection member, the foot further configured to secure the release tab to the release structure by securing the release tab arm to a connection member on the release structure.

4. The pluggable transceiver module of claim 3, wherein the lifting member prevents misalignment of the computer connection and electrical connection inside a computer connection port.

5. The pluggable transceiver module of claim 3, wherein the lifting member comprises a ramp for displacing the latch structure by lifting the structure above a recessed position behind the lifting member when the release tab is actuated.

6. A pluggable transceiver module comprising:
  a module housing having a computer connection that aligns with an electrical connection inside a computer connection port, the module housing further having a module connection port opposite the computer connection, the module connection port for receiving a wired connection, the computer connection and module connection port for facilitating transmission of electrical and optical signals; and
  a release structure comprising:
    two release arms extending integrally from the release structure along the module side surfaces toward the computer connection port at the rear of the module housing;
    a flexure member mounted on the outside of the module housing, the flexure member comprising a segmented movable portion that torsionally deforms when a load is applied to the release structure; and
    a linking member extending integrally and perpendicularly from the flexure member, the linking member comprising a fixed portion that remains in place on the module housing when a load is applied to the release structure, the fixed portion converts the flexure member into a torsional spring under load, the torsional spring returns the release structure to its original position when the release structure is unloaded.

7. The pluggable transceiver module of claim 6, wherein the segmented moveable portion on the flexure member comprises at least three segments separated by a narrow gap of open space.

8. The pluggable transceiver module of claim 7, wherein the segments are arranged in a sinuous zigzag pattern comprising an alternating arrangement of rectangular segments and rounded gaps of open space.

9. The pluggable transceiver module of claim 6, wherein the flexure member is integrally arranged with the release arms in an anti-planar configuration that sets the flexure member on an axis distinct from the release arms.

10. The pluggable transceiver module of claim 6, further comprising a release tab connected to the release structure and extended from the module housing, the release tab configured to receive an applied force, the release tab further configured to move the release structure by transferring the applied force from the release tab to the release structure.

11. The pluggable transceiver module of claim 10, wherein the release tab is configured to stress the flexure member by transferring the force applied to the release tab to the flexure member.

12. The pluggable transceiver module of claim 10, wherein the force transferred from the release tab deforms the flexure member by expanding the distance between the segmented movable portion on the flexure member and the fixed portion on the linking member.

13. The pluggable transceiver module of claim 10, wherein the release tab is composed of a soft, flexible plastic material.

14. The pluggable transceiver module of claim 6, further comprising a rotating crossmember attached to the sides of the release structure.

15. The pluggable transceiver module of claim 14, wherein the crossmember actuates the release structure when rotated in front of the module housing.

16. The pluggable transceiver module of claim 14, wherein the crossmember provides a grasping surface configured to receive an applied force when the crossmember is rotated in front of the module housing.

17. The pluggable transceiver module of claim 14, further comprising a cam member attached to the crossmember, the cam member configured to move the release structure on the module housing when the crossmember rotates by wedging between the housing and the release structure, the cam member further configured to deform the integrated flexure member by moving the unfixed portion of the flexure member relative to the fixed portion.

18. The pluggable transceiver module of claim 14, wherein the cam member has a curved cam geometry opposite the crossmember, the curved cam geometry configured to regulate movement of the cam member so that moving the release mechanism to an unlatched position requires a full rotation of the crossmember.

19. The pluggable transceiver module of claim 6, wherein the length of the linking member is variable according to the amount to travel the release structure needs to unlock the module from the computer port.

20. The pluggable transceiver module of claim 6, wherein the length of the linking member is variable according to the amount of mechanical leverage required to move the release structure a distance sufficient to unlock the module from the computer port.

* * * * *